US006249375B1

(12) United States Patent
Silhengst et al.

(10) Patent No.: US 6,249,375 B1
(45) Date of Patent: Jun. 19, 2001

(54) OPTICAL ELEMENT FOR TRAFFIC SIGNS, DISPLAY PANELS OR THE LIKE

(75) Inventors: Franz Silhengst, Ollern; Friedrich Peter Hofstadler, Linz; Alexander Otto, Bisamberg/Vienna, all of (AT)

(73) Assignee: Swarco Futurit Verkehrssignal Systeme Ges m.b.H. (AT)

( * ) Notice: Subject to any disclaimer, the term of this patent is extended or adjusted under 35 U.S.C. 154(b) by 0 days.

(21) Appl. No.: 09/233,985

(22) Filed: Jan. 19, 1999

(30) Foreign Application Priority Data

Jan. 19, 1998 (AT) .......................................................... 63/98

(51) Int. Cl.[7] .................................................... G02B 18/00

(52) U.S. Cl. .......................... 359/362; 362/268; 362/800; 362/812; 116/63 R

(58) Field of Search ..................................... 359/362, 399; 362/268, 331, 336, 800, 812; 116/63 R

(56) References Cited

U.S. PATENT DOCUMENTS 6,019,493 * 2/2000 Kuo et al. ............................ 362/800

FOREIGN PATENT DOCUMENTS 3126 554 3/1982 (DE) .
40 03 905 7/1991 (DE) .
0 180 145 5/1986 (EP) .
0 453 932 10/1991 (EP) .
WO 94/07085 3/1994 (WO) .

* cited by examiner

*Primary Examiner*—Cassandra Spyrou
*Assistant Examiner*—Mark A. Robinson
(74) *Attorney, Agent, or Firm*—Kilpatrick Stockton LLP

(57) ABSTRACT

An optical element for changeable traffic signs consisting of a light source, in particular, a light-emitting diode (LED), at least one converging lens and one diverging lens, which are arranged coaxially in a shared housing. The light exiting from the light source is captured as completely as possible by the converging lens, concentrated in a focal spot, which is preferably surrounded by a diaphragm and directed further onto the diverging lens which distributes it according to certain specifications. The refracting power of the diverging lens is dimensioned such that light exiting from it features a smaller angle of exit $\beta$ than a prescribed limit angle $\alpha$. The distance between the converging lens and the diverging lens is dimensioned such that sunlight incident from the outside at an angle $\gamma$ greater than or equal to the limit angle $\alpha$ is completely blocked, either by the diaphragm or by absorption on the housing wall, so that no phantom light is generated.

17 Claims, 2 Drawing Sheets

OPTICAL ELEMENT FOR TRAFFIC SIGNS, DISPLAY PANELS OR THE LIKE

BACKGROUND OF THE INVENTION

In changeable traffic signs up to this point, the light of one or more lamps has been divided up onto a number of dots of light that are arranged into symbols or alphabetic characters, and the change between displays has been brought about by turning the associated lamps on and off.

Since there have been successful efforts to produce light-emitting diodes (LEDs) with high light concentration, light strength and long service life in a number of colors or at least in all the established signal colors, there have been attempts to use the advantages of light-emitting diodes over ordinarily used incandescent lamps, such as emission of an oriented light beam, considerably longer service life and a very favorable energy ratio for colored light, in promotional and informational signs, and also for traffic signals. It was attempted, in particular, to replace the technologically expensive fiber optics in changeable traffic signs. The use in graphics-capable displays is also being promoted because, with appropriate wiring, each LED can be individually driven and therefore permits individually programmable representations and information.

Light-emitting diodes are distinguished from conventional incandescent lamps not only by their production of light by means of semiconductor technology, which generates a nearly monochromatic light, but also by integrated optical mechanisms for directing light which, on the one hand, improve the proportion of useful light, and, on the other, produce universal favorable light distribution characteristics in narrow and broad beam models, so that the LEDs can be used directly as a signal light without additional optical measures.

While no overriding regulations with regard to phototechnical characteristics exist for promotional and information signs, they have existed in the field of traffic engineering for a long time with, in particular, light color, brightness, light distribution and, above all, a very low phantom light (illusion of a turned-on signal light due to incident sunlight) being prescribed. Ordinary commercial models meet these requirements only in part, but are used nonetheless as long as customer-specific models of the LEDs are completely uneconomical and also cannot be implemented by some manufacturers for technological reasons.

If the LEDs are used directly in traffic engineering without additional optical measures, then light color, brightness and uniformity usually meet specifications, while the required light distribution can often be achieved only by the insertion of additional lenses. High phantom light is the main problem. The rounded end of the usually clear transparent LED element concentrates incident sunlight directly onto the highly reflective components in the interior of the LED, such as reflector and reflector rim, terminal lugs and contact points, from where it is reflected back. Because of the clear transparent LED element, the phantom light is relatively whitish and unfiltered and often appears brighter during an unfavorable sun position than the actual signal light.

It is becoming an established specification in traffic engineering that a sun position of 10° vertically above the optical axis (usually the direction of maximum light emission) is assumed for the assessment of phantom light. At such angles, special measures must be taken under any conditions in order to limit the above-described effect.

Whereas, in signal transmitters, the signaling unit equipped with a number of LEDs in a fixed arrangement can be examined and improved in its totality with regard to phantom behavior, individual light-dot optics must be considered in changeable traffic signs, so that they can be combined in an arbitrary number and arrangement into symbols or alphabetic characters.

One known measure consists in placing a converging lens a suitable distance in front of a relatively wide-radiating LED (FIG. 8). Given sufficient distance from the LED, the sunlight incident at an angle is guided completely outside the LED and absorbed on housing surfaces. This arrangement, however, has the disadvantage of a large space requirement and is therefore not suited to universal application.

Another measure consists in placing horizontal lamellae (FIG. 9, top) or tubular sections (FIG. 9, middle) in front of the LED in order to deflect the sunlight; small, elongated sun blinds or chutes (FIG. 9, bottom) are also used, particularly for multiple LED light dots, and, in principle, these are also customary for signal transmitters. Here it is of particular disadvantage that these add-on elements must either be protected by a front pane from the effects of weather and dirt or frequently cleaned. They are used particularly for LED arrangements in a rectangular grid.

Another measure consists in the use of lenses or LED elements colored in the signal color (tinting). The sunlight must pass through the died component twice, wherein especially the extraneous color components of the light are filtered out, but the LED light only once, the coloring being as transparent to the actual signal color as possible. In this way, the sunlight is considerably attenuated, but the useable light is also reduced to a lesser extent. Not only is the reduced useable light strength, which must be compensated by a larger number of light dots, a disadvantage, but so is the phantom light in the signal color, which is viewed particularly critically in a number of applications.

Another disadvantage is the generally circularly symmetrical light radiation of light-emitting diodes, which has the effect that a large component of the light is unusable, radiated into irrelevant areas, unless optical measures are again taken.

Furthermore, ordinary commercial light-emitting diodes have radiation characteristics which generally do not agree with the required light distribution of the light dots. For this reason disproportionately more LEDs must often be used, barring additional optics, merely in order to have sufficient light in the low-light areas. In many cases, the required light distribution cannot be achieved without additional measures.

The problem of the invention is to develop a universal LED optical element for changeable traffic signs which can be used without a front pane and with a smooth outer surface and exhibits the advantages of LEDs, such as low power consumption, long service life and freedom from maintenance, but, on the other hand, exhibits no phantom light, which permits individually adaptable, in particular, oval light distributions without significant light losses, which can be adapted to different LED models, LED suppliers or radiation characteristics and permit a particularly small axial separation between adjacent optical elements.

SUMMARY OF THE INVENTION

This is solved according to the invention by arranging, in the optical element, a light source, preferably a light-emitting diode (LED), at least one converging lens and one diverging lens, surrounded by a shared housing, essentially coaxially with the geometrical axis of the element, wherein the converging lens concentrates the light beams exiting at each point of its surface facing the diverging lens, themselves divergent by an angle $\gamma$, as completely as possible onto the diverging lens, wherein the diverging lens is of such a design that nearly all the light beams exiting from it lie at an inclination below an established angle of inclination $\alpha$, and wherein the housing is constructed as a tube-like sleeve around the light source, the converging and the diverging lens, is completely enclosed on its periphery and is provided on the inside with a light-absorbing color and structure.

The invention will now be described on the basis of drawings.

DETAILED DESCRIPTION OF PREFERRED EMBODIMENT

Figure 1:
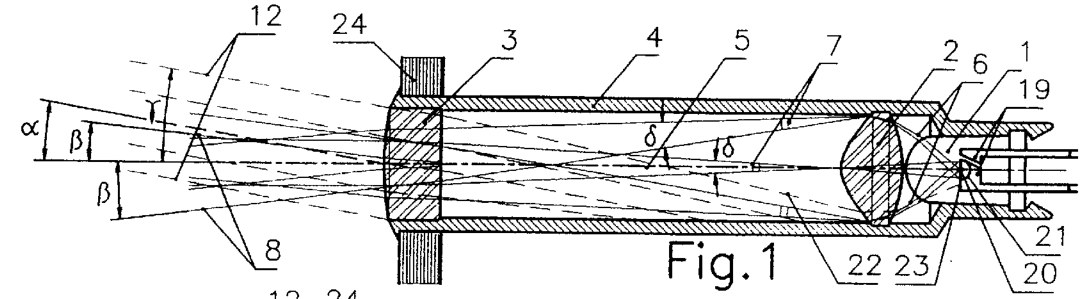
FIGS. 1 to 7 show preferred embodiments in cross section and, in comparison.

FIG. 1 shows a vertical section through an optical element according to the invention. The light source 1, represented in all examples as an LED with broad emission characteristics, emits its light 6 onto the converging lens 2 arranged coaxially immediately in front of it. On the one hand, a better light concentration is possible in this way than through the use of a narrowly concentrating LED and, on the other, the concentration of the light can be influenced. Components 19 are designed to be inside the LED 1. They serve to supply power to and position the actual luminescent semiconductor chip 20, but also form an auxiliary reflector 21, which reflects the laterally radiating light into the main radiation direction and therefore have highly reflective surfaces. Thus the LED does not act as a point source for the optical elements located in its immediate vicinity; it emits a mixture of direct and reflected light beams. The light can therefore be focused only imperfectly, which is why it is not possible to provide any physically exact data on the lens geometries, but only qualitative descriptions of their characteristics.

Light beams 7 emerge at each point of the converging lens 2, the divergence $\delta$ of which is conditioned by the type and magnitude of all the components 19, 20 and 21 and must be determined specially for each point of the converging lens 2. The geometry of the converging lens is therefore preferably determined in iterative calculations. The beams of lightrays 7 are preferably deflected such that, as much as possible, all their light beams pass through the diverging lens 3, which is arranged coaxially a defined distance away from the converging lens. There the beams of lightrays 7 are deflected or scattered such that the desired light distribution 8 is achieved.

The angle $\alpha$ gives the light incidence limit for interfering light, in particular, the light from the sun in a low position 12. The sun specifications assume a sun position of 10° vertically above the reference axis (usually the direction of highest useful light intensity). Due to unavoidable tolerances and the size of the sun's diameter itself, setting this angle of inclination $\alpha$ to roughly 9° is recommended, but another arbitrary angle can also be adopted. The size of the angle $\alpha$, in any case, determines the entire geometry of the optical element.

The geometry of the diverging lens 3 is set up such that the exiting light beams 8 always remain below the angle of inclination $\alpha$ in their inclinations $\beta$. In this way, it is assured that, in the other direction as well, no light beam 12, insofar as it strikes the optical element at an angle $\gamma$ less than or equal to $\alpha$, finds the same path back, either via the reflector 21 or directly up to chip 20 of the LED 1 and thus simulates an illumination of the LED. Nevertheless, light beams 22 can penetrate up to the LED 1. In the process, they strike other surfaces 23, not directly involved in light emission, are often multiply reflected and refracted on the glass element of the LED and in that manner also generate a certain phantom light. The length of the optical element is therefore preferably established such that no sunbeam 12 at all which has an angle of incidence $\gamma$ greater than or equal to the angle of inclination $\alpha$ can penetrate up to the converging lens 2 or the LED 1. To that end, the housing is constructed with a surface structure, such as circumferential grooves, which is as matte and light-absorbing as possible, preferably in black, so that it can absorb all the incident light beams 12 as well as possible.

It is immediately evident that sunbeams 12 with an arbitrarily steeper angle of incidence $\gamma$ are absorbed further forward in the housing 4, so that freedom from phantom light can be assumed for all sun positions above the angle of inclination $\alpha$.

The housing 4 is completely enclosed at the periphery in order, on the one hand, to be able to absorb light at every point and on the other, to inhibit light exchange inside the device, but also to prevent the contamination of the lenses.

The optical element is mounted in a matrix plate 24. The dimensions of the components are not substantially larger in diameter than the LED itself and thus a correspondingly dense arrangement is possible. If certain light losses are acceptable, the diameter can be even further reduced.

In order to achieve a smooth outside, it is also possible to construct the diverging lens 3 with a flat front surface and to place the converging elements completely on the inside; it is even conceivable to construct the diverging lens 3 completely flat without refraction, if the light distribution generated by the converging lens 2 already corresponds to requirements. In this case, a shared front pane could be placed in front of the device instead of the converging lenses 3.

Figure 2:
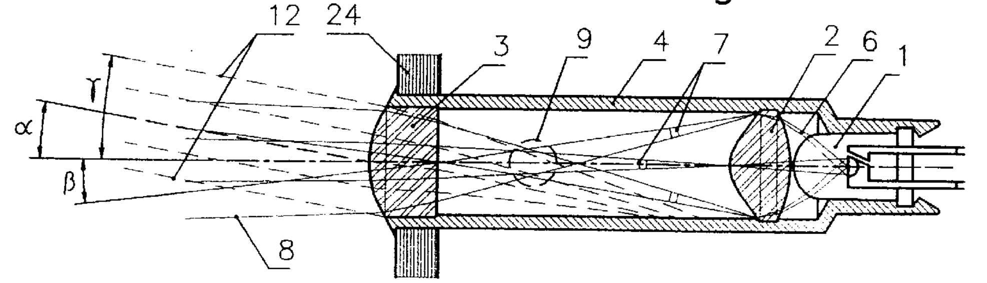

FIG. 2 shows a model that features a smaller length overall than in FIG. 1. The diverging beams of lightrays 7 intersect before striking the diverging lens 3 and there, form a focal spot 9. To this end, the converging lens 2 requires a higher refractive power than in the previous example. Depending on the desired light distribution 8 and the resulting refractive power of the diverging lens 3, there also exists the possibility here that all sunbeams 12 that have an angle of incidence $\gamma$ greater than or equal to the angle of inclination $\alpha$ are absorbed on the housing wall.

Due to the focal spot 9, a free space arises between housing wall and useful light beams, which can markedly improve the phantom light behavior, either by a constriction of the housing 4 at this point, or better, by the installation of at least one diaphragm 10.

Figure 3:
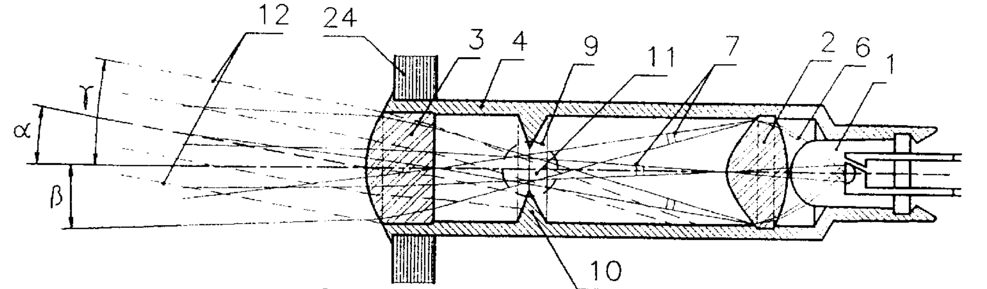

FIG. 3 shows a diaphragm 10 in the area of the focal spot 9, whose aperture 11 is adapted to the periphery of the beams of lightrays 7. It completely hinders sunbeams 12 from further penetration into the housing interior.

Light absorption on a housing wall is never accomplished completely, due to the inevitable surface luster, so that light beams reflected diffusely from the housing wall can reach the LED. A further improvement of the phantom light behavior is then possible if all intruding light beams 12 can be trapped at the diaphragm 10.

Figure 4:
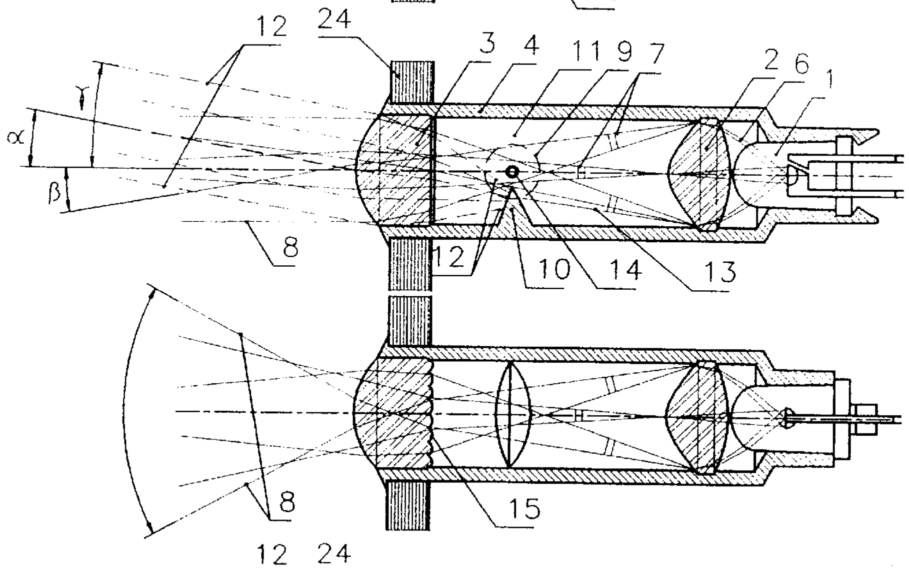

FIG. 4 shows such an optical element in a plan view and a front view. The diverging lens 3 possesses a focal point 14 in the area of the focal spot 9, where a diaphragm 10 is also located. The distance from the diverging lens 3 and the size of the diaphragm are selected such that the focal point of sunbeams 12 are incident parallel to the inclination of the angle of incidence α lies inside the diaphragm 10 or immediately behind it. Thus, no sunbeam can penetrate further into the interior.

Under certain circumstances, slight light losses, illustrated by the cut-off useful light beam 13 must also be accepted. It is likewise shown that here the diaphragm 10 in the upper area of the optical element is not necessary, since no sunlight can reach there.

According to the laws of optical imaging, the construction of the scattering lens with focal point 14 results in the light distribution 8 yielding an upside-down image of the diaphragm aperture 11, as well as the light distribution and intensity prevailing there. The establishment of the light distribution in this case must be done by a suitable detailed design of the converging lens 2, by pivoting the beams of lightrays 7 more or less. In any case, increased losses appear, due to marginal light beams 13 at the diaphragm 10 or to useful light beams no longer striking the diverging lens 3.

FIG. 4 additionally shows that the focal point 14 is necessary only in the vertical direction. In the plan view it can be recognized that, with the aid of the vertical diverging optics 15 on the inside of the diverging lens 3, a horizontal width-scattering of the emitted light 8 occurs, so that overall an arbitrary oval light distribution can be achieved.

Figure 5:
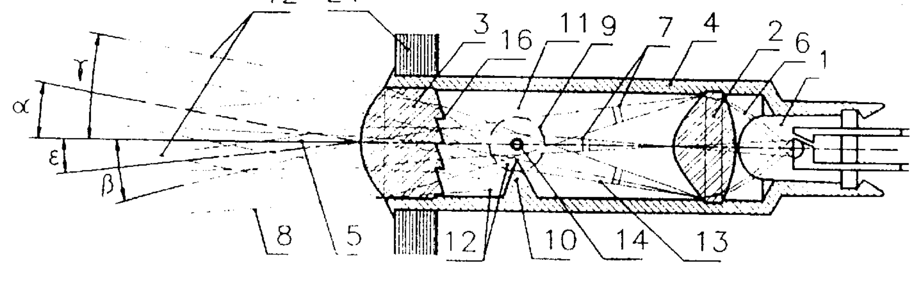

FIG. 5 shows the deflection of the light distribution 8 by an angle ϵ, caused by a horizontal lens structure 16. In this way, the visibility is improved in those cases in which the display device cannot by tipped downwards at an angle. The sensitivity to phantom light improves by the same angle ϵ, because the sunbeams 12 are also deflected downwards against the diaphragm 10 by this amount.

For all models with light distributions, diaphragms and optical elements that are not circularly symmetrical, a non-round structure for the optical elements is recommended, so that proper assembly is insured by a form fit.

Figure 6:
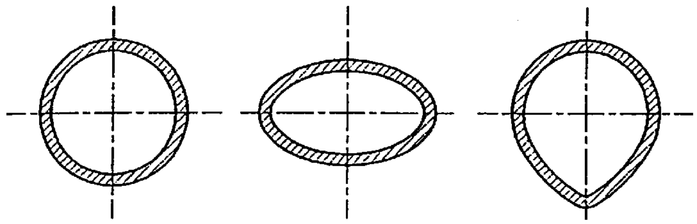

Alongside the round shape, FIG. 6 shows an oval model for optical elements with a horizontal axis of symmetry, in particular, also for oval radiating optical elements, as well as an egg-shaped model with only one single possibility of positioning.

Figure 7:
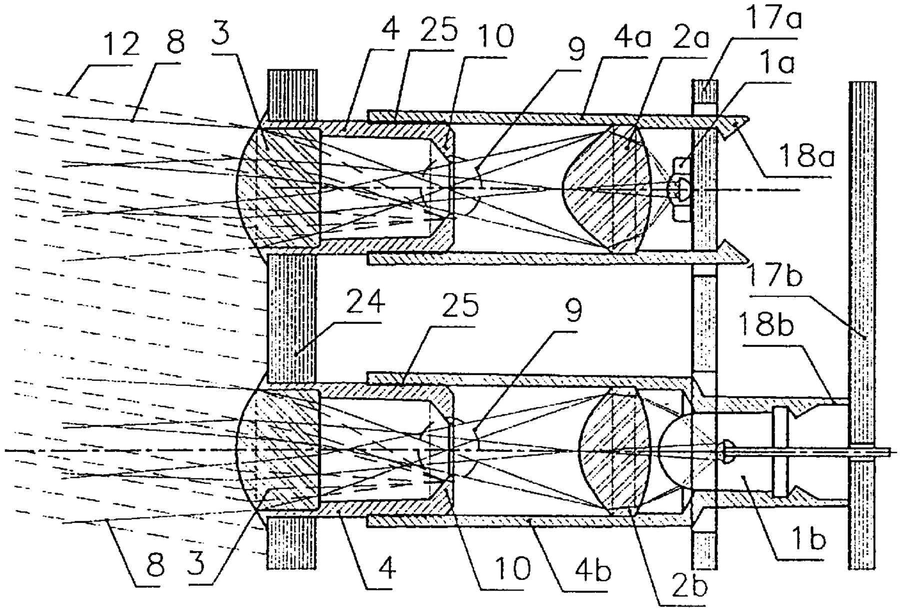
Figure 8:
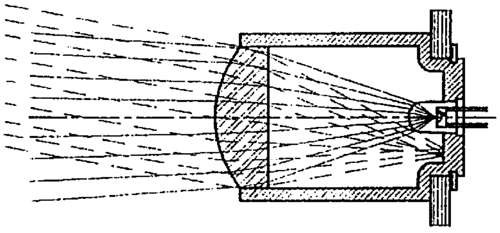
Fig.8 PRIOR ART
FIGS. 8 and 9 show previously conventional solutions.
Figure 9:
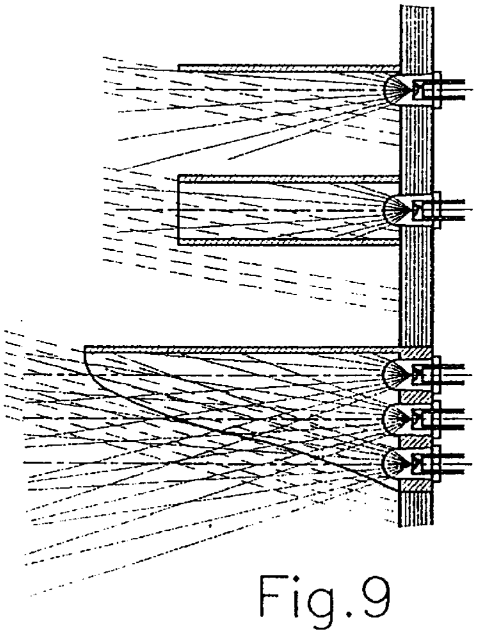
Fig.9 PRIOR ART

In further elaboration of the invention, the housing 4 can also be designed in split form, whereby the diaphragm can be easily integrated. The subdivision permits, in particular, the construction of a modular system with differing light distributions and manufacturer-specific LED models. FIG. 7 presents such a modular system with optical, mechanical and electrical interfaces.

The diverging lens 3 and the diaphragm 10 are housed in the anterior housing 4, the posterior housing containing in each case the converging lens and the LED. While the posterior housing 4 and the diaphragm 10 are identical here, the anterior housing varies according to LED type. Since every LED model has its own radiation characteristics, the converging lens must also be individually fitted. If each LED type exhibits approximately the same light distribution at the focal spot 9, it can be combined arbitrarily with different diverging lenses 3. These can have the same outside shape; the differing diverging structures are located on the inside. Shown at the top is an an LED 1*a* in SMD technology, which is almost always soldered onto a board. Thus, all LEDs 1*a* can be mounted on a shared board 17*a*, which also contains the wiring and the power supply. After soldering, the board 17*a* is snapped onto the projections 18*a* of the associated housing 4*a*, so that the optical elements can all be supported and aligned by one another. Even the mixing of different types of LEDs is possible, but space for their housings 4*b* must be left blank on the board 17*a*. At the bottom, an LED 1*b* in the standard Ø3 or Ø5 mm model is shown. It can, on the one hand, likewise be soldered onto a board 17*b*, for which projections 18*b* are placed on the housing 4*b* for exact positioning. It can also be wired free-standing, as is recommended for small production runs and individually constructed equipment.

Particularly with free-standing wiring, it is possible to shift the housing parts relative to one another and thus adjust the optics. For this purpose, threading, snap grooves or the

What is claimed is:

1. Optical element for changeable signs, comprising a light-emitting source, (1), at least one converging lens (2) and one diverging lens (3), which are arranged in a shared housing (4), essentially coaxially with the geometrical axis (5) of the element, and of an angle of inclination α established to be directed upwards from the geometrical axis (5) in the direction of light emitted from the light source, wherein substantially all the light (6) exiting from the light source (1) is captured by the converging lens (2) and concentrated onto the diverging lens (3) arranged a defined distance away and deflected by the latter in the direction of observation in order to achieve a prescribed light distribution (8), characterized in that the converging lens (2) concentrates the beams of lightrays (7) exiting at each point of its surface facing the diverging lens (3), divergent by an angle δ, onto the diverging lens (3), that the diverging lens (3) is of such a design that substantially all the light beams (8) exiting from the diverging lens (3) lie at an inclination β below the angle of inclination α, and that the housing (4) is constructed as a tube-like sleeve around light source (1), converging lens (2) and diverging lens (3), is completely enclosed on its periphery and is provided on the inside with at least one of a light-absorbing color and structure.

2. Optical element according to claim 1, characterized in that the divergent beams of lightrays (7) intersect before striking the diverging lens (3) and there, form a focal spot (9).

3. Optical element according to claim 2, characterized in that a diaphragm (10) is provided at the position of the focal spot (9) featuring an aperture (11) such that no single light beam (12) that strikes the diverging lens (3) from the outside from a direction with an inclination γ greater than or equal to the angle of inclination α can pass through the diaphragm aperture (11).

4. Optical element according to claim 3, characterized in that the diverging lens (3) features a focal point (14) that lies in the area of the focal spot (9) and thereby the light-emission characteristics of the optical element, according to the laws of optical imaging, corresponds substantially to the inverted geometry of the diaphragm aperture (11) and to the light distribution and intensity of all light rays prevailing there, which are influenced by means of geometry of the converging lens (2), even accepting light losses (13) at the diaphragm (10).

5. Optical element according to claim 4, characterized in that the focal point (14) of the diverging lens (3) is effective only in the vertical direction, and an optical structure (15), on the inside of the diverging lens (3), produces a scattering of light in the horizontal direction, which distorts the emission characteristics of the optical element arbitrarily in an oval shape.

6. Optical element according to claim 1 characterized in that the housing (4) features a constriction in at least one point between converging lens (2) and diverging lens (3), a diaphragm (10) whose aperture (11) is adapted to the common outline of all beams of lightrays (7) and whose surface features at least one of a light-absorbing paint and structure.

7. Optical element according to claim 1, characterized in that the distance between converging lens (2) and diverging lens (3) is dimensioned, and the light refraction at each point of the diverging lens (3) is established, such that substantially every light beam (12) that strikes the diverging lens (3) from a direction with an inclination $\gamma$ greater than or equal to the angle of inclination $\alpha$ is deflected onto the inner wall of the housing or a diaphragm (10) and absorbed.

8. Optical element according to claim 1, characterized in that the housing (4) penetrates into the beam path of all the light rays and blocks and absorbs an arbitrary light component there (13).

9. Optical element according to claim 1, characterized in that, by inclining of the inside or by overlying of a prismatic structure, the design of the diverging lens (3) brings about a pivoting of the main direction of light emission with respect to the geometrical axis of the optical element (5) by the angle $\epsilon$ downwards.

10. Optical element according to claim 1, characterized in that the cross sections of the components, as well as installation openings therefore, can be circular, oval, or egg-shaped.

11. Optical element according to claim 1, characterized in that the housing (4) comprises several parts, wherein at least diverging lens (3) and diaphragm (10) are installed in one housing part and converging lens (2) and light source (1) in another housing part.

12. Optical element according to claim 1, characterized in that housing parts, lenses, diaphragms and light sources are conceived as a modular system for implementing optical systems with differing emission characteristics, light strength and light color, as well as for the use of light sources of different types and manufacturers.

13. Optical element according to claim 1, characterized in that housing parts are joined movably with respect to one another in order to adjust the optics.

14. Optical element according to claim 1, characterized in that at least one of the diverging lens (3) and the light source itself, is tinted in the emitted light color and transparent to an arbitrary intensity.

15. Optical element according to claim 1, characterized in that the light source (1) of one or more optical elements comprises at least one LED seated on a shared board (17), which contains wiring or driving elements as well as additional device components and supports the optical elements among themselves and in a precise orientation.

16. Optical element according to claim 15, characterized in that the component containing the light source (1) features projections (18), with the aid of which the light source can be precisely positioned on the board (17) for the soldering process, or the board (17) can act as a positioning aid and support for the optical elements.

17. Optical element according to claim 1, characterized in that at least one of converging lens (2) and diverging lens (3) are constructed as Fresnel lenses.

* * * * *